United States Patent [19]

Curtis

[11] 4,365,117
[45] Dec. 21, 1982

[54] TELEPHONE HOLD CIRCUIT

[76] Inventor: William A. Curtis, 10420 Scripps Way, Stanton, Calif. 92640

[21] Appl. No.: 176,194

[22] Filed: Aug. 7, 1980

[51] Int. Cl.³ .............................................. H04M 1/00
[52] U.S. Cl. ................................. 179/99 H; 179/81 R
[58] Field of Search ............ 179/99 H, 81 R, 18 AD, 179/18 B

[56] References Cited

U.S. PATENT DOCUMENTS

| | | | |
|---|---|---|---|
| 3,629,514 | 12/1971 | Flamini, Jr. | 179/99 H |
| 3,848,094 | 11/1974 | Russell | 179/18 FA |
| 3,895,192 | 7/1975 | Angner et al. | 179/99 H |
| 4,093,829 | 6/1978 | Silbenman | 179/81 R |
| 4,219,701 | 8/1980 | Feiner | 179/99 H |
| 4,232,199 | 11/1980 | Boatwright et al. | 179/99 H |

Primary Examiner—Gerald L. Brigance
Attorney, Agent, or Firm—Jackson, Jones & Price

[57] ABSTRACT

An electronic hold circuit for a telephone which is actuated by a hold command signal produced by a momentary depression of the telephone hook switch. The hold circuit is connected across the telephone lines and includes circuitry for discriminating between a hold command signal present on the telephone lines and dialing, ringing and hand-up signals. When a hold command signal is detected, a holding impedance is connected across the telephone lines thereby maintaining the connection at the central office.

12 Claims, 3 Drawing Figures

TELEPHONE HOLD CIRCUIT

BACKGROUND OF THE INVENTION

1. Field of the Invention

The present invention relates to telephony and more particularly to a telephone hold circuit which places the telephone on-hold upon momentary actuation of the telephone hook switch.

2. Prior Art

Telephones having a hold feature are well known in private automatic exchange installations utilizing multi-line pushbutton telephones. Such apparatus is disclosed in U.S. Pat. No. 3,909,553 issued to Marshall, U.S. Pat. No. 3,909,554 issued to Reed, U.S. Pat. No. 4,056,695 issued to Angner et al., U.S. Pat. No. 3,925,625 issued to Angner et al. and U.S. Pat. No. 3,965,308 issued to Jones et al. In addition, hold circuitry suitable for use with ordinary domestic telephones is disclosed in U.S. Pat. No. 3,246,082 issued to Levy and U.S. Pat. No. 4,011,413 issued to Phillips.

The Phillips reference is typical of the prior art hold circuits and is perhaps the most relevant reference. Phillips discloses a hold circuit suitable for use with ordinary domestic telephones. As can be seen in FIG. 1 of the Phillips reference, a separate hold switch module 21 is attached to the housing of each telephone on the line. The user places a call on hold by depressing a momentary contact push-button switch 31 projecting from the housing while simultaneously returning the receiver to the cradle. Once the receiver is in the cradle, the push-button is released and the call is placed on hold.

Although the Phillips reference discloses a relatively simple circuit for providing a hold feature to a pre-existing telephone, such circuit possesses various shortcomings. Perhaps the most serious shortcoming is the requirement that each telephone be provided with a separate hold switch and hold switch module.

The novel hold circuit disclosed herein overcomes the disadvantage of the prior art circuits including the circuit disclosed by Phillips. By way of example, all of the circuitry of the subject invention may be enclosed in a single module which may be placed within the housing in one of the telephones. The circuit is simply connected across the telephone lines and requires no modification of any of the telephones. Most importantly, the telephone hook switch is used to place the telephone in a hold condition so as to eliminate the necessity of a separate hold switch. Further advantages of the subject invention will become apparent from the subsequent detailed description.

SUMMARY OF THE INVENTION

An electronic hold circuit for use with a telephone is disclosed. The telephone is connected to central office switching equipment via telephone lines and is provided with a hook-switch for switching the telephone between an on-hook and an off-hook condition. A hold command signal is generated on the telephone lines when the user momentarily depresses the hook switch, thereby momentarily placing the telephone in an on-hook condition.

The hold circuit is provided with hold command detection circuitry for detecting the presence of a hold command signal. Further provided is holding circuitry coupled to the telephone which is responsive to the output of the hold command detection circuitry. When a hold command signal is detected, the holding circuitry produces an on-hold condition wherein the the central office switching equipment is caused to maintain the connection with the telephone.

DETAILED DESCRIPTION OF THE INVENTION

Figure 1A:
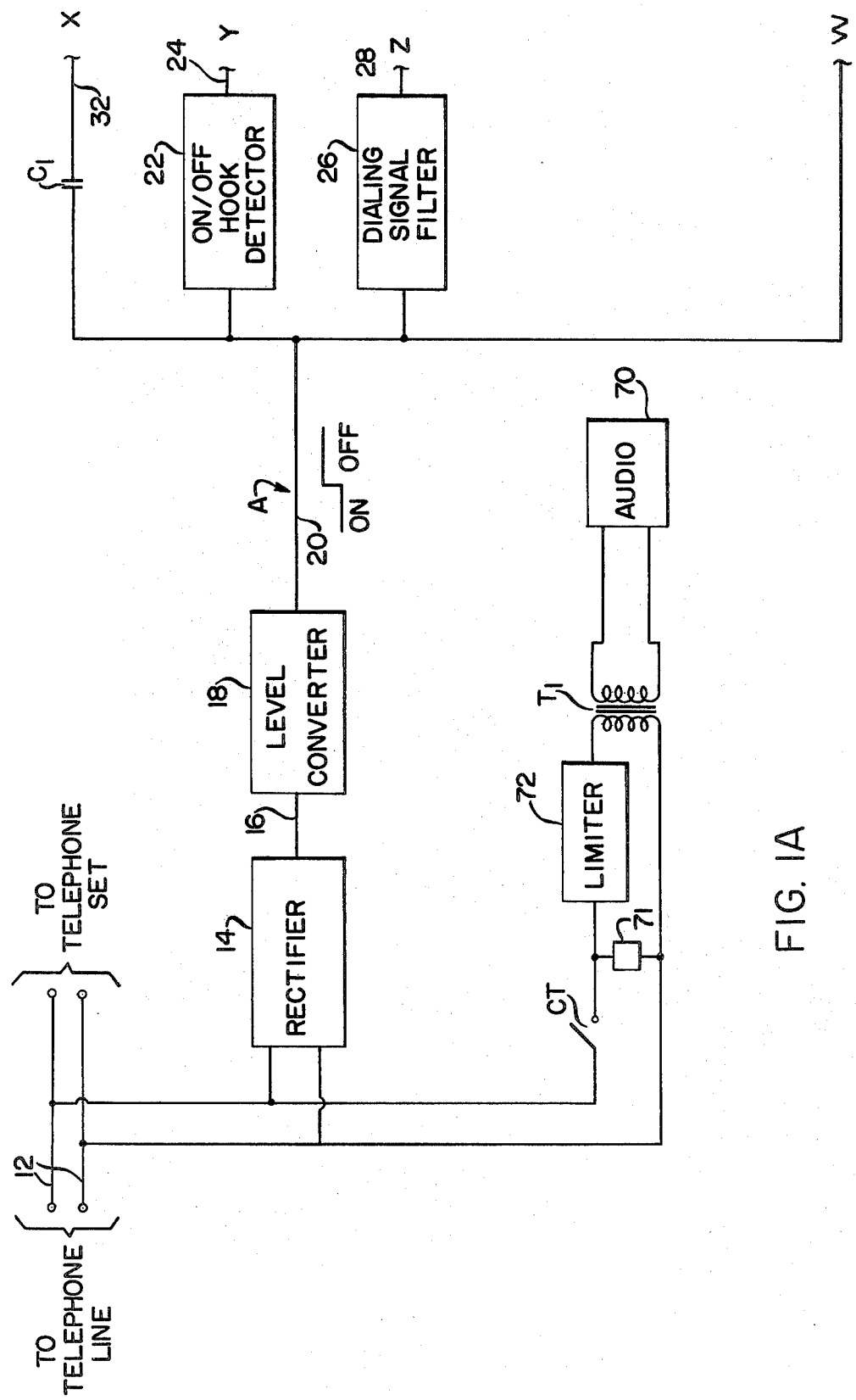
FIGS. 1A and 1B are simplified schematic diagrams of the subject telephone hold circuit.
Figure 1B:
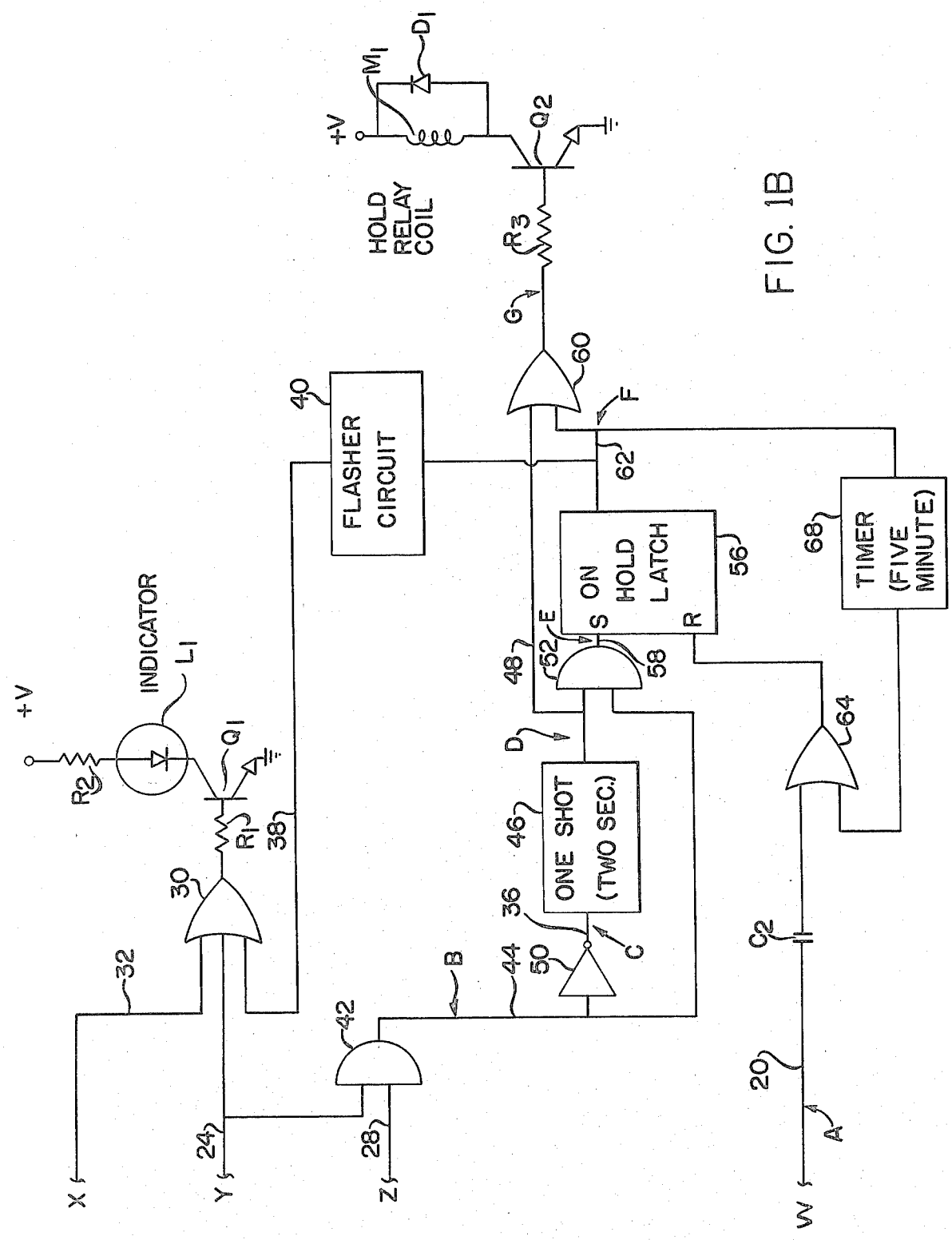

Referring now to the drawings, a simplified schematic diagram of the subject invention may be seen in FIGS. 1A and 1B. The subject hold circuit can be constructed as a compact unit which is preferably installed within the telephone set (not shown) housing. The only portion of the circuit which need be visible is the telephone status light L1. The inputs of the hold circuit are adapted to be connected across the telephone lines 12 in parallel with the telephone set. This is the only connection which need be made.

The voltage across telephone lines 12 depend upon many factors including the particular equipment used at the central telephone office. When the telephone is in the on-hook condition, the voltage is at a high level, typically on the order of 50 volts. When the telephone is in the off-hook condition, the voltage across lines 12 drops to a relatively low level on the order of 8 to 12 volts. As will be described in greater detail below, the telephone line voltage also varies when a ringing signal or a dialing signal is present on the lines.

The polarity of the voltage across lines 12 can also vary depending upon the particular equipment used at the central telephone office. Accordingly, a rectifier circuit 14 or an equivalent thereof is provided for producing a positive going signal on line 16, irrespective of the polarity of the voltage on lines 12. Rectifier circuit 14, which has a relatively high input impedance so as not to load the telephone line, is followed by a level converter which converts the signals on line 16 to voltage levels which are compatible with the logic circuitry. Level converter 18 preferably provides a 0 to 12 volt logic signal A on line 20.

Figure 2:
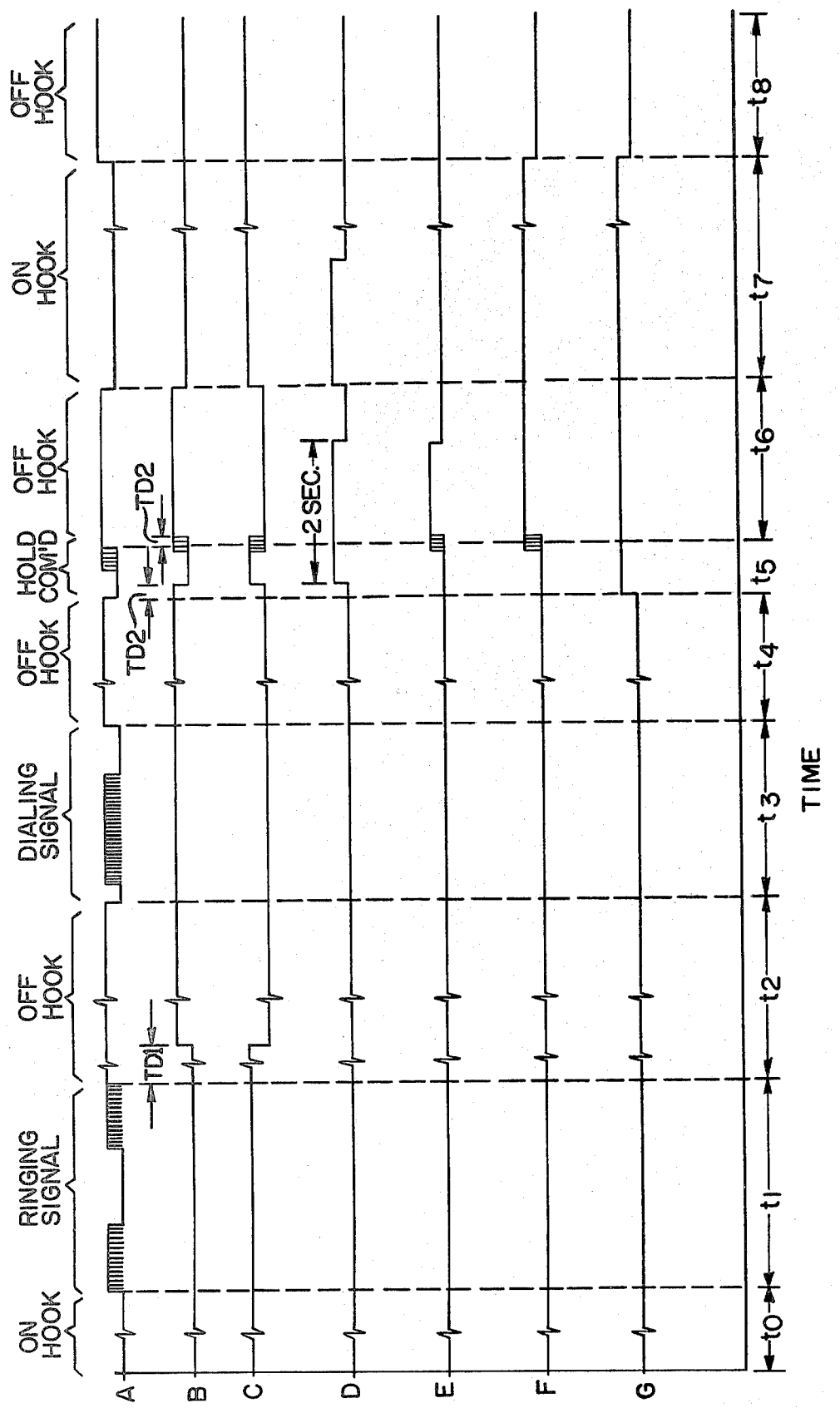
FIG. 2 is a timing diagram showing the waveforms of typical signals either generated or processed by the subject telephone hold circuit.

Exemplary waveforms for Signal A may be seen in the timing diagram of FIG. 2. During time period $t_0$, the telephone set is in an on-hook condition so as to produce a low (approximately 0.0 volt) logic signal. When the telephone is being rung, as during time period $t_1$, Signal A is a series of ringing signal bursts. The bursts have a period of 1.0 second or less and are comprised of ringing signals in the range of approximately 16 HZ to 80 HZ, with 60 HZ being a typical value (the ringing signal waveforms are not shown to scale).

An off-hook condition causes Signal A to go high (approximately 12 volts) as shown in the diagram at time period $t_2$. When the telephone is dialed, a series of dialing signals are produced as shown in time period $t_3$. These pulse signals are produced by a standard rotary dial telephone and have a frequency range of approximately 8 HZ to 11 HZ, with 10 HZ being a typical value (the dialing signal waveforms are not shown to scale). If a "touch-tone" telephone is used, a series of tone bursts will be produced rather than dialing pulses. The frequency of the tones is relatively high (audio range) with each burst having a period equal to the time the tone button is depressed. Finally, a hold command signal is produced during time period $t_5$ whereby the user momentarily depresses the telephone hook switch for the purpose of causing a hold condition. The switch should be depressed for greater than approximately 0.15 seconds and less than 1.0 second.

Referring back to FIGS. 1A and 1B, the Signal A output on line 20 is connected to an On/Off Hook Detector 22 which detects whether the telephone is in an on-hook or an off-hook condition. Detector 22 is basically a low pass filter which filters out the dialing signals and the ringing signals. The frequency cut-off point for the detector is approximately 0.25 HZ. Accordingly, a high signal will be produced on the detector output line 24 when the phone is in an off-hook condition even if dial pulses are present. Similarly, a low signal will be produced on line 24 when the phone is in an on-hook condition, even if ringing signals are present.

The Signal A output on line 20 is also connected to a Dialing Signal Filter 26. Dialing Signal Filter 26 is basically a conventional low-pass filter or envelope detector which blocks the relatively high frequency dialing signals and permits a hold command signal to pass. The cut-off frequency of Dialing Signal Filter 26 is approximately 10 HZ, therefore the 1.0 HZ component of the ringing signals will also be passed.

Signal A on line 20 is further connected to one of the inputs of an OR gate 30 through a coupling capacitor C1. In addition, the output of On/Off Hook Detector 22 on line 24 is connected to a second input of OR gate 30. As will be subsequently described in greater detail, the third input of OR gate 30 is connected to a Flasher Circuit 40 which produces pulse signals when the telephone is in a hold condition.

The output of OR gate 30 drives the base of a common-emitter configured NPN transistor Q1 via input resistor R1. A series connected limit resistor R2 and light emitting diode (LED) L1 are coupled between a positive voltage source +V and the collector of transistor Q1. Thus, when one or more of the inputs to OR gate 30 goes high, the resultant high output of the gate causes transistor Q1 to conduct thereby turning on LED L1.

As previously noted, LED L1 indicates the status of the telephone. LED L1 is not illuminated when the telephone is inactive. When the telephone is in an off-hook condition, the high output of On/Off Hook Detector 22 on line 24 will cause LED L1 to be steadily illuminated. As will be subsequently described, when the telephone is in a hold condition, Flasher Circuit 40 is caused to produce a train of pulse signals on line 38 which cause LED L1 to flash on and off.

The On/Off Hook Detector 22, Dialing Signal Filter 26 and associated circuitry serve to discriminate between a hold command signal on telephone lines 12 and dialing and ringing signals on such lines. The majority of the remainder of the hold circuitry is devoted to discriminating between a hold command signal and a telephone hang-up signal which is produced when the telephone is hung up after a call. As previously noted, a hold command signal is produced when the telephone user momentarily depresses the telephone hook switch. The depression must be longer than approximately 0.15 seconds and less than approximately 2.0 seconds. The frequency response characteristics of the Dialing Signal Filter 26 are such that the hold command signal will be passed. However, the Dialing Signal Filter 26 will also pass the unwanted low frequency component of the ringing signals. Accordingly, an AND gate 42 is provided having one input connected to the output of the On/Off Hook Detector 22 via line 24 and the other input connected to the output of the Dialing Signal Filter 20 via line 28. When the telephone is in an on-hook condition, the On/Off Hook Detector output on line 24 is low, thereby inhibiting AND gate 42 so as to gate out the low frequency component of the ringing signals.

The AND gate 42 output on line 43 is coupled to a conventional one shot 46 through an inverter 50. One shot 46 is configured to produce a 2.0 second pulse at the output on line 48 when the inverter 50 output on line 36 goes high. The AND gate 42 output is also connected to one of the inputs of an AND gate 52. The output of one shot 46 is connected to the remaining input of AND gate 52.

An On-Hold Latch Circuit 56 is provided having a set input which is connected to the output of AND gate 52 via line 58. The output of Latch 56 is connected to one of the inputs of an OR gate 60 via line 62. As will be subsequently described, the telephone will be placed in an on-hold condition when the On-Hold Latch 56 output is high. The remaining input of gate 60 is connected directly to the output of one shot 46 via line 48.

The On-Hold Latch Circuit 56 is reset by the output of an OR gate 64. One input of OR gate 64 is connected to the output of Level Converter 18 via a series-connected coupling capacitor C2. Thus, when the telephone changes from an on-hook to an off-hook condition, the resultant positive pulse produced at the input of OR gate 64 through capacitor C2 causes a gate output pulse which resets Latch Circuit 56. In addition, a back-up Timer Circuit 68 is provided which will automatically reset the On-Hold Latch 56 if the latch remains set for longer than a predetermined time period. The input of the Timer Circuit 68 is coupled to the output of the latch 56 via line 62. When the latch output goes high, thereby indicating an on-hold condition, Timer Circuit 68 is triggered. After a predetermined time period of approximately 5.0 minutes, a positive pulse is produced at the timer output thereby causing the latch 56 to reset via OR gate 64.

The output of OR gate 60 controls a Hold Relay comprised of a Hold Relay coil M1 and Hold Relay contact CT. A conventional relay coil drive circuit comprised of a common emitter configured NPN transistor Q2, based-connected input resistor R3 and protection diode D1 is provided which causes the relay coil to be energized when the output of OR gate goes high. The energized coil causes the normally-open relay contacts CT to close. One terminal of relay contact CT is connected to one of the telephone lines 12 with the remaining contact being connected to an impedance element 71. Although element 71 can be a resistor, it is preferable that the element be comprised of back-to-back 12.0 volt zener diodes connected in series with a limiting resistor. When the contact CT is closed, one of the diodes (depending on the polarity of the telephone line voltage) is forward biased and one of the diodes is broken down to its zener voltage of 12 volts. Thus, the voltage across the telephone lines is held at approximately 12.0 volts (ignoring the small drop across the limiting resistor), thereby simulating an off-hook condition even though the telephone may actually be in an on-hook condition. Thus, the central office telephone switching equipment is caused to maintain the connection to the caller. The telephone lines will remain seized and in an on-hold condition so long as contact CT remains closed.

When the telephone is placed in an on-hold condition, it is preferable that an audio signal be introduced onto the telephone lines 12 so as to signal the caller that the telephone line has not been disconnected. Accordingly, an audio signal source 70 is preferably provided which provides music or the like. The output of the audio source is connected across the telephone lines via a conventional audio step-up transformer T1. A limiter circuit 72 is connected in series with one of the transformer T1 outputs for the purpose of protecting the telephone lines from overloading should the audio source output be too great.

Having described the various components which comprise the subject telephone hold circuit, a brief description of the circuit operation will now be given. Referring to the timing diagram of FIG. 2, when the telephone is in an on-hook condition, Signal A on line 20 remains low during timer period $t_0$. Thus, the outputs of the On/Off Hook Detector 22 and the Dialing Signal Filter 28 remain low as does the output of AND gate 42.

When ringing pulses are produced, as during time period $t_1$, the low frequency component is passed through the Dial Signal Filter 28. However, the ringing pulses are completely filtered by the On/Off Hook Detector so that the output of the Detector will remain low so as to continue to inhibit AND gate 42. The ringing pulses are also coupled to OR gate 30 through capacitor C1 so that the indicator LED L1 will flash on and off in response to the pulses.

During time period $t_2$, the telephone is lifted off the hook switch thereby placing the telephone in an off-hook condition. As previously noted, Signal A goes high in the off-hook condition as does the output of Dialing Signal Filter 26 after a short time delay TD2. Delay TD2, which is due to filtering, is approximately 100 ms. The output of On/Off Hook Detector 24 also goes high after a filtering delay TD1 of approximately 3.0 seconds. Once the output of Detector 24 goes high, both inputs to AND gate 42 are high. Thus, the output B on line 44 of AND gate 42 goes high and the inverter 50 output C on line 36 goes low. One shot 46 is triggered only by a rising edge, therefore the Signal D output of the one shot remains unchanged.

As previously noted, dialing signals are produced during time period $t_3$. On/Off Hook Detector 24 and Dialing Signal Filter 26 are both implemented to remain high when the dialing signals are present, therefore the Signal B output of AND gate 42 will remain in a high condition. The telephone remains in an off-hook condition during the subsequent time period $t_4$. Accordingly, Signal B remains unchanged as do the other signals.

During time period $t_5$, the user generates a hold command signal by momentarily depressing the telephone hook switch. When the hook switch is first placed in an on-hook condition, Signal A goes low. The output of the Dialing Signal Filter 26 goes low after a filter time delay TD2 which, as previously noted, is typically approximately 100 ms. The low filter output on line 28 causes the Signal B output of AND gate 42 to go low and the inverter 50 Signal C output to go high. Positive going Signal C triggers one shot 46 which produces an output Signal D having a pulse width of 2.0 seconds.

Signal D causes transistor Q2 to be turned on by way of OR gate 60 thereby causing the Hold Relay Coil M1 to be energized. Energization of coil M1 causes the Hold Relay contact CT to close, thereby placing resistor RL across telephone lines 12 so as to simulate an off-hook switch condition regardless of the state of the telephone hook switch. The telephone lines will remain seized for a minimum of 2.0 seconds, which is the duration of the Signal D one shot output pulse.

When the telephone hook switch is released within 2.0 second or less following the hook switch depression, Signal A returns to a high state. The output of On/Off Hook Detector 24 will remain high during time period $t_5$ due to filtering. Accordingly, the Signal B output of AND gate 42 will go high when the output of the Dialing Signal Filter 26 goes high.

The high Signal D output of one shot 46 and the high Signal B output of AND gate 42 are ANDed together by gate 52 to produce a Signal E pulse which sets the On-Hold Latch 56. The resultant high Signal F output of Latch 56 causes the Hold Relay Coil M1 to remain energized via OR gate 60 once the 2.0 second Signal D output of one shot 46 disappears. Thus, the telephone will remain in an on-hold condition so long as Signal F is high, regardless of the position of the telephone hook switch. In addition, Signal F energizes Flasher Circuit 40 which causes the LED L1 to flash, thereby indicating that the telephone is on hold.

During time period $t_7$, the telephone hand set is returned to the cradle, thereby placing the telephone in an on-hook condition. Although the resultant negative transition of Signal B causes one shot 46 to retrigger, On-Hold Latch 56 remains set, thereby maintaining the telephone in an on-hold condition. The telephone will remain in an on-hold condition for a maximum of 5.0 minutes. At the end of the 5.0 minute period, back-up timer 68 resets latch 56 through OR gate 64, thereby causing the telephone to go out of the on-hold condition and release the telephone lines.

If the telephone handset is lifted off the hook switch within the 5.0 minute period, the positive going Signal A transition at the beginning of timer period $t_8$ causes the On-Hold Latch 56 to be reset via coupling capacitor C2 and OR gate 64. The telephone will accordingly go out of the on-hold condition, but the telephone lines will, of course, remain seized so long as the telephone remains off the hook.

As previously noted, the telephone hook switch must be depressed for less than approximately 2.0 second if a hold command is to be produced. If the switch is depressed for greater than approximately 2.0 second, the telephone lines will be released and the telephone will be "hung-up". This sequence is described as follows. When the hook switch is depressed, Signal A goes low as does the output of the Dialing Signal Filter 26 after delay TD2 which is typically in the order of approximately 100 ms. The low output of Filter 26 causes one shot 46 to be triggered via AND gate 42 and inverter 50. The 2.0 second duration high Signal D output of one shot 46 immediately causes the telephone lines to be seized via OR gate 60, as previously described. If the hook switch remains depressed for greater than 2.0 seconds, Signal B will go high after the one shot Signal D output has gone low. Accordingly, AND gate 52 will not be enabled and On-Hold Latch 56 will not be set. Thus, the telephone lines will be released upon termination of the 2.0 second Signal D one shot output pulse.

While a preferred embodiment of a novel telephone hold circuit has been described hereinabove, it is intended that all matter contained in the above description and shown in the drawings is illustrative only and that certain modifications may be effected by persons skilled in the art without departing from the spirit and scope of the invention as defined by the appended claims.

In the claims:

1. A hold circuit for use with a telephone, the telephone being connected to central office switching equipment via telephone lines and provided with a hook switch for switching the telephone between an on-hook and an off-hook condition, said hold circuit comprising:
   a hold command detecting means for detecting a hold command signal which is generated when a user activates the hook switch so as to momentarily place the telephone in an on-hook condition, said hold command detecting means including:
   (i) on/off hook detecting means for detecting when the telephone is in an on-hook and an off-hook condition;
   (ii) dialing signal filter means for discriminating between a hold command signal and a dialing signal;
   (iii) gating means responsive to said on/off hook detecting means and to said dialing signal filter means for producing a first output signal when either a hold command signal or a telephone hang-up signal is present on the telephone lines;
   (iv) discriminating means responsive to said first output signal for discriminating between a hold command signal and a telephone hang-up signal; and
   holding means coupled to the telephone lines, said holding means being a means for producing an on-hold condition when a hold command signal is detected by said discriminating means wherein the central office switching equipment is caused to maintain a connection with the telephone.

2. The hold circuit of claim 1 where the discriminating means is responsive to the timing of said first output signal.

3. The hold circuit of claim 2 further comprising a latching circuit which is set in response to the detection of a hold command signal by said discriminating means and which is reset when said telephone is switched to an off-hook condition following a hold command signal, said latching circuit generating an output when set which produces an on-hold condition.

4. The hold circuit of claim 3 wherein an on-hold condition is produced for a predetermined time period when the telephone is switched to an on-hook condition.

5. The hold circuit of claim 4 wherein an on-hold condition is produced by said holding means by switching an impedance across the telephone lines.

6. The hold circuit of claim 5 further comprising audio means for producing an audible signal on the telephone lines when a hold condition exists.

7. The hold circuit of claim 1 wherein said first output signal is a pulse signal and said discriminating means is a pulse width detector.

8. The hold circuit of claim 1 wherein said on-off hook detecting means comprises a low pass filter.

9. The hold circuit of claim 8 wherein said low pass filter filters out ringing signals present on the telephone line.

10. The hold circuit of claim 1 wherein said dialing signal filter means is a low pass filter.

11. The hold circuit of claim 10 wherein said low pass filter filters out dialing signals present on the telephone line.

12. A hold circuit for use with a telephone, the telephone being connected to central office switching equipment via telephone lines and provided with a hook switch for switching the telephone between an on-hook and an off-hook condition, and wherein a hold command signal may be produced on the telephone line when the user momentarily places the telephone in an on-hook condition, said hold circuit comprising:
   on/off hook detecting means for producing a first signal indicative of whether the telephone is in an on-hook or an off-hook condition, said first signal being independant of any ringing signal on the telephone line;
   dialing signal filter means for producing a second signal when ringing signals or hold command signals are present on the telephone line, said second signal being independant of any dialing signal on the telephone line;
   discriminating means responsive to said first and second signals for discriminating between a hold command signal and a telephone hang-up signal and for producing a third signal when a hold command signal is present on the telephone lines; and
   holding means coupled to the telephone lines and responsive to said third signal, said holding means being a means for producing an on-hold condition when a hold command signal is on the telephone line wherein the central office switching equipment is caused to maintain a connection with the telephone.

* * * * *